M. G. HUBBARD.
Harvester Rake.
No. 426. Reissued Feb. 3, 1857.
Fig. 1,
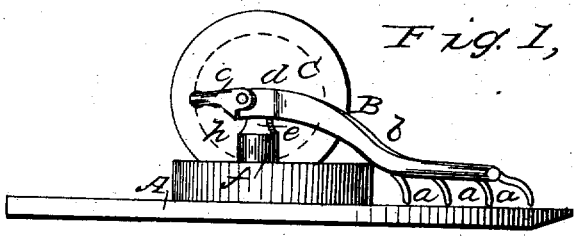
Fig. 2,
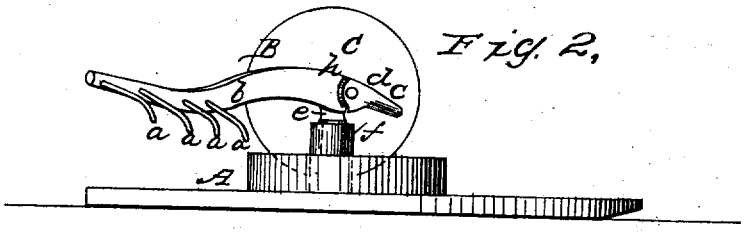
Fig. 3,
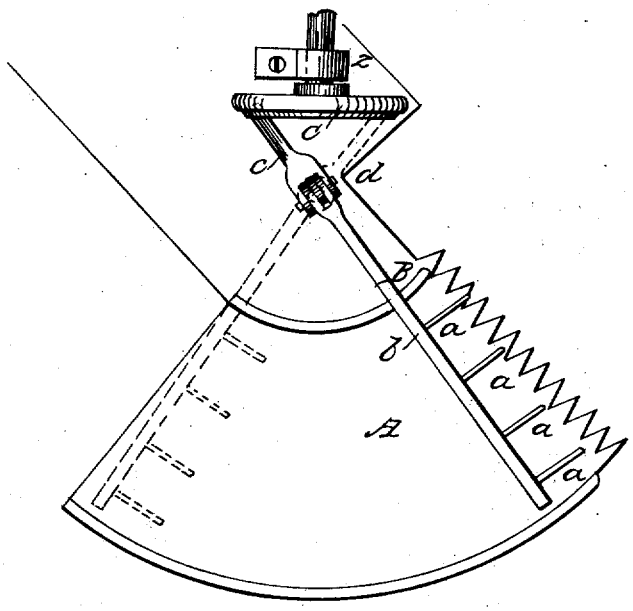
N. PETERS, Photo-Lithographer, Washington, D. C.

UNITED STATES PATENT OFFICE.

M. G. HUBBARD, OF PENN YAN, NEW YORK.

IMPROVED RAKING ATTACHMENT FOR REAPERS.

Specification forming part of Letters Patent No. 15,655, dated September 2, 1856; Reissue No. 426, dated February 3, 1857.

*To all whom it may concern:*

Be it known that I, MOSES G. HUBBARD, of Penn Yan, in the county of Yates and State of New York, have invented a new and Improved Raking Attachment for Reapers; and I do hereby declare the following to be a full and exact description thereof, reference being had to the accompanying drawings, in which—

Figures 1 and 2 are side elevations of my improvement. Fig. 3 is a plan or top view.

The letters of reference correspond in all the figures.

I am aware that many devices for self or automatic raking having been devised; but, so far as my experience goes, they have been too complex or wholly inefficient for practical purposes. The object of my invention was to furnish by some simple and elementary device a motion to the rake that would answer the proper purpose and could be adjusted to the work to be done, while it involved no complex movements or parts liable to derangement. So far as my information extends, this has not been effected in so direct and efficient a manner as by my device.

The construction of my apparatus is as follows:

The platform of the reaper (designated by letter A on the drawings) is in form the segment of a circle, as clearly shown in Fig. 3. At the center-point of this circle there is a standard or fulcrum-point, *f*, having a socket in its upper end, into which a pivot fits that is connected with the arm of the rake at a joint, *d*. The arm of the rake B is made in two parts, *b* and *c*, which are jointed together by a rule-joint of any sufficient form that will stop the downward flexure when brought into a straight line, while the parts are free to bend upward without limit within any range necessary to their operation. The rule-joint of course prevents all lateral bending of the parts. The arm of the rake thus constructed and pivoted at *f* can be swept over the platform in either direction and raised from it or brought down upon it by moving the end of the arm *c* in a proper manner. This movement is effected by means of a disk, C, connected with the driving-power, by which it is revolved on its axis *g*. The end of arm *c* is pivoted in this disk C at a point near its periphery, so that by revolving the disk C the end of arm *c* will describe a circle or an ellipse, according to the relative position of the disk and pivoting-point, or, in other words, the plane of motion of the disk and arm. In the drawings a perfect circle is represented by the position of parts; but it will be noted that while that portion of the rake-arm lettered *c* makes the circle the other part of the arm to which the teeth *a* are affixed is raised (see Fig. 2) and brought over in the segment of a circle from the rear to the front of the platform into the position seen Fig. 3; but when it comes in contact with the platform the upward flexure of the joint *d*, above named, permits the arm *b* to sweep horizontally over the platform to the rear, when, by the depression of the end of arm *c*, the arm *b* is again raised, as represented at Fig. 2, to be returned to the front for a renewed action.

It will be seen that the only apparatus I here use is a simple jointed arm pivoted on a standard and moved by the well-known pentagraphic motion of the interposed disk, by which it has been common to describe geometrical figures, and to which *per se* I make no claim; but by the use of the disk in this connection I avoid catching the loose cut grass and clogging during the operation of the machine, so that in this combination it so far differs from a crank when used for giving motion to the rake.

By this construction and application of parts I form a cheap and durable automatic reaper-rake, efficient in its action and readily repaired and used with the minimum amount of power required for removing the grain from the platform.

Having thus fully described my improvements in the automatic rake for reaping-machines, what I claim therein as new, and for which I desire to secure Letters Patent, is—

The combination of the jointed rake-arms *b* and *c* with the disk C, by which the arm B is actuated, when the above parts are constructed and arranged for joint operation in the manner and for the purposes set forth.

M. G. HUBBARD.

Witnesses:

J. ROMEYN,

P. M. HUTTON.